United States Patent [19]
Schaller et al.

[11] Patent Number: 5,365,436
[45] Date of Patent: Nov. 15, 1994

[54] ELECTRONIC MANAGEMENT SYSTEM FOR HEAVY-DUTY TRUCKS

[75] Inventors: David A. Schaller, Fort Wayne, Ind.; Richard S. Kroll, Aurora; Zbigniew F. Kosobucki, Chicago, both of Ill.; Eric T. Swenson, Fort Wayne, Ind.; Charles R. Cornell, Naperville; Gregory L. Pence, Lisle, both of Ill.

[73] Assignee: Navistar International Transportation Corp., Chicago, Ill.

[21] Appl. No.: 4,344

[22] Filed: Jan. 14, 1993

[51] Int. Cl.[5] .................. G06F 13/00; B60Q 1/00
[52] U.S. Cl. .................. 364/424.03; 364/424.04; 340/459; 307/9.1
[58] Field of Search ............ 364/424.03, 424.04, 364/424.05, 424.07, 431.12, 550, 551.01; 340/425.5, 438, 525, 459; 307/10.1, 38–42, 19, 91

[56] References Cited

U.S. PATENT DOCUMENTS

| | | | |
|---|---|---|---|
| 4,258,421 | 3/1981 | Juhasz et al. | 364/424 |
| 4,760,275 | 7/1988 | Sato et al. | 307/10.1 |
| 4,804,937 | 2/1989 | Barbiaux et al. | 340/425.5 |
| 4,926,331 | 5/1990 | Windle et al. | 364/424.04 |
| 4,939,652 | 7/1990 | Steiner | 364/424.04 |
| 5,018,087 | 5/1991 | Dannenberg | 364/571.01 |
| 5,184,301 | 2/1993 | Stasell | 364/431.07 |
| 5,224,045 | 7/1993 | Stasell | 364/431.07 |

OTHER PUBLICATIONS

Letter from "Navistar International Transportation Corp." dated Sep. 1991.

Primary Examiner—Thomas G. Black
Assistant Examiner—Tan Q. Nguyen
Attorney, Agent, or Firm—Dennis K. Sullivan

[57] ABSTRACT

An electronic data link that services components of the vehicle including components other than the engine and an electronic engine management system that services the engine operate in different data formats and are interfaced by a special electronic module that provides translation services for accomplishing bi-directional through-transmission of data between them. The module has programmable memory with different levels of security and can detect the absence of a vehicle speed sensor at incipient vehicle launch. The speed sensor serves both the data link and the electronic engine management system through the special module.

11 Claims, 7 Drawing Sheets

| FUNCTIONS | MRD SYSTEM MODES ||||
|---|---|---|---|---|
| | 1 OFF | 2 IGNITION | 3 CRANK | 4 RUN |
| DATA TRANSLATION | NO | YES | (YES) | YES |
| PARAMETER TRANSLATION | NO | YES | (YES) | YES |
| EXT. COMMAND PASSAGE | NO | YES | (YES) | YES |
| PROGRAMING | * | YES | NO | NO |
| INTERNAL DIAGNOSTICS | NO | YES | (YES) | YES |
| ROAD SPEED CALIBRATION | NO | YES | (YES) | YES |
| ENGINE SPEED BUFFERING | NO | YES | (YES) | YES |
| EVENT LOGGING | NO | NO | (YES) | YES |
| ODOMETER | * | NO | (YES) | YES |
| ENGINE HOURS | * | NO | (YES) | YES |
| TOTAL FUEL | * | NO | NO | NO |
| ELECTRONIC COMPATIBILITY | NO | YES | (YES) | YES |
| ATA PROCESSING | NO | YES | NO | YES |
| MODE IDENTIFICATION | NO | YES | (YES) | YES |
| PASSWORD AUTHORIZATION | NO | YES | (YES) | YES |
| | ENGINE NOT ROTATING || ENGINE ROTATING ||
| | VPM MODES ||||

PASSWORD AUTHORIZATION PROCEDURE
STEP 1: DETERMINE AUTHORIZATION LEVEL
1.1 IF ALGORITHMIC PASSWORD AUTHORIZATION IS REQUESTED, GO TO STEP 3.
1.2 EXAMINE THE DATA ELEMENT SECURITY CODE FOR EACH REQUEST DATA ELEMENT NAME.
1.3 IF ANY DATA ELEMENT REQUIRES THE ALGORITHMIC PASSWORD, THE REQUEST FAILS.
1.4 PROCEED WITH STEP 2.

STEP 2: CUSTOMER PASSWORD AUTHORIZATION.
2.1 COMPARE THE MODULE'S CUSTOMER PASSWORD WITH THE REQUEST'S PASSWORD.
2.2 IF THE PASSWORDS ARE THE SAME, THEN THE REQUEST PASSES.

STEP 3: GENERATE ALGORITHMIC PASSWORD.
3.1 COMPUTE PASSWORD SEED VALUE; COMPRESS INPUTS.
3.2 GENERATE PASSWORD FROM COMPRESSED DATA.
3.3 COMPARE GENERATED PASSWORD WITH THE REQUEST'S PASSWORD.
3.4 IF THE TWO PASSWORDS ARE THE SAME, THEN THE REQUEST PASSES.

ELECTRONIC MANAGEMENT SYSTEM FOR HEAVY-DUTY TRUCKS

FIELD OF THE INVENTION

This invention relates to electronic management systems for engine-powered automotive vehicles. More specifically, it relates to a novel electronic management system for a heavy-duty on-road or off-road vehicle, such as a heavy truck, in which a special electronic module functions to adapt a commercially available engine electronic control (EEC) module to the vehicle's electronic network for bi-directional, through-transmission of electronic data between the EEC module and the vehicle network, while simultaneously endowing the system with manufacturing, assembly, inventory, service, model compatibility, and function enhancements.

BACKGROUND AND SUMMARY OF THE INVENTION

Vehicle on-board electronic systems in heavy-duty trucks have been defined by the American Trucking Association (ATA). Certain recommended practices of the Society of Automotive Engineers (SAE) relating to on-board electronic vehicle systems, in particular J1708, J1587, and J1809, conform to these ATA requirements. Further, compliance with SAE J1809 is preferred in heavy-duty vehicles. J1809 is a recent SAE RP that specifies waveform characteristics for vehicle speed and engine speed signals. J1809 requires electronic modules to sink and source high levels of current, more than those provided by today's typical modules.

For compliance with such ATA requirements, a manufacturer of heavy-duty trucks must provide a conforming on-board electronic vehicle system. Since electronic engine management is an essential consideration in an on-board electronic vehicle system, it too must conform to ATA requirements. Yet, time and costs associated with truck design and manufacture for the size and demands of the heavy-duty truck market are such that it may be prohibitive to design, fabricate, and inventory total on-board electronic vehicle systems which include integral electronic engine management systems that have compatibility with ATA requirements and the corresponding SAE recommended practices. This is because highway trucks are ordered by customers on a highly customized basis, and the volume of highway truck production is comparatively small when measured against the total automotive vehicle market.

The present invention arises in part through the recognition that an electronic engine management system need only to appear to the vehicle network that it conforms with ATA requirements and corresponding SAE recommended practices. In one respect, the present invention relates to a total on-board electronic vehicle system which is fully compatible with ATA requirements and the corresponding SAE recommended practices for heavy trucks, yet uses an EEC module that is already commercially available even though that EEC module is itself not directly compatible with such ATA requirements and the corresponding SAE recommended practices. By utilizing an available EEC module, especially one that has already been tooled and is being fabricated on a commercial production basis, considerable savings in design and development time and in design, development, and fabrication costs may be reaped. This is especially important to the highway truck manufacturer because of the nature of the market, as described above.

Briefly, the present invention is able to take advantage of a known EEC module which is not directly compatible with ATA requirements and the corresponding SAE recommended practices by providing a special new and unique electronic module that in effect provides a bi-directional electronic interface between a vehicle network's ATA-compliant data link and such an EEC module. This special electronic module is however much more than merely a "translator" of electronic data passing between the network and the EEC module. It is operatively associated with certain other components of the vehicle in a manner that provides a new and unique organization for operatively relating these other components with the vehicle network and the EEC module.

Internal combustion engines for heavy-duty trucks have different displacements and ratings. Each combination of engine displacement and rating requires an engine management computer that is uniquely tailored to the engine's specific combination of requirements. Even though an engine management computer may possess hardware capabilities that enable it to be potentially used with a number of specific engines, it must nevertheless be software-adapted for a specific engine. Given the significant number of different displacement/rating combinations, a large number of unique engine management computers is necessary because of the need to program each for the specific displacement/rating of a given engine. As one can appreciate, this would introduce a need for many unique part numbers into a business system, adding cost and complexity to service and inventory requirements. Accordingly, it is a desirable objective to minimize the number of unique parts that are required to serve a large number of engine displacement/rating combinations, and as will be seen herein, that objective is fully accomplished by the present invention.

A further complicating factor in the case of heavy-duty or highway trucks is that a variety of optional features must be offered, and some of these involve engine management. For example, road speed limiting and cruise control are two such features. An engine management computer must take the presence or absence of such features into account, and if it cannot, the possibility of offering other than a standard set of features, which could be neither individually deleted nor individually added to, would be foreclosed, thereby seriously limiting the ability of the vehicle manufacturer to accommodate purchasers' requests for specific combinations of option features.

The present invention provides a capability for programming the special electronic module with data for a particular engine displacement/rating combination selected from a number of different such combinations and with data for a particular combination of option features selected from a number of different option features.

The special electronic module contains hardware that can be programmed with data that allows it to be used with a vehicle containing a particular engine and a particular combination of option features. It is the particular data that is programmed into the module that adapts what is otherwise a basic standard module into a custom one for the particular vehicle. Certain data is programmed into the module at the factory based on equipment installed. Other data may be programmed by the dealer or by the owner, assuming that they possess suitable equipment. To the extent that the known EEC module does not possess architecture for accommodating all the needs of the system, such architecture is provided in the special electronic module.

In accordance with another aspect of the invention, the special electronic module is endowed with different levels of programming security. Some data should be alterable, if at all, only by the vehicle manufacturer, and that data would have the highest level of security. Other data may be programmable, or alterable, by the dealer or owner, in which case it is assigned a lower level of security. Compatibility checks are also provided to assure that the programmed module is fully compatible with the hardware and software with which it is connected in the vehicle in which it is installed. This will help to safeguard against the possibility of hardware or software incompatibility, especially at times of service after a vehicle is in use.

A still further aspect of the invention involves the ability to detect the presence or absence of the vehicle speed sensor. This is important, especially at vehicle launch, and if the speed sensor is found to be absent, the vehicle system is enabled to take certain actions.

DESCRIPTION OF THE DRAWINGS

The foregoing, along with additional features, advantages, and benefits of the invention, will be seen in the ensuing description and claims which should be considered in conjunction with the accompanying drawings. The drawings disclose a presently preferred embodiment of the invention according to the best mode presently contemplated for carrying out the invention, in which:

DESCRIPTION OF THE PREFERRED EMBODIMENT

Figure 1:
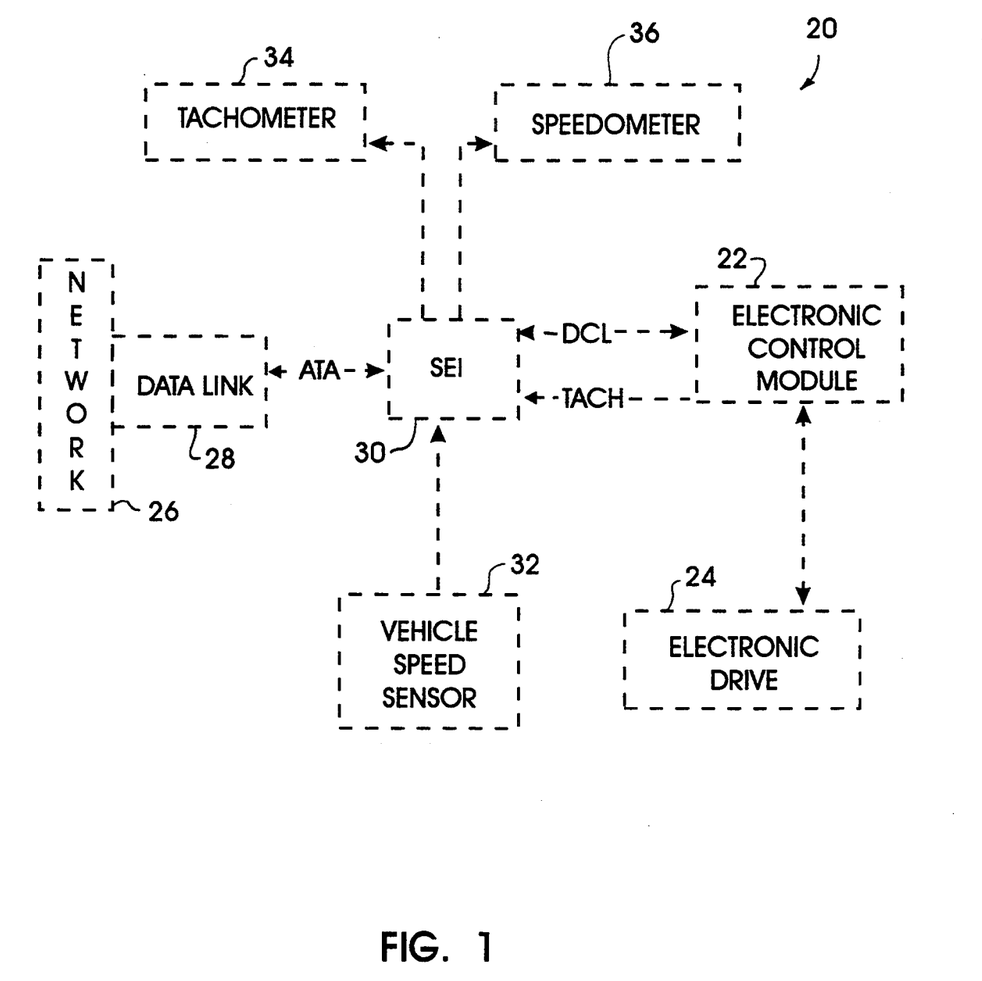
FIG. 1 is a general block diagram of an on-board electronic system of a vehicle in accordance with the invention.

FIG. 1 presents a general block diagram of the on-board electronic vehicle system 20. It comprises an engine electronic control (EEC) module 22, an electronic drive unit module 24, a vehicle network 26 having a data link 28, and a special electronic interface (SEI) module 30. Data link 28 serves to connect the vehicle network with SEI module 30 and comprises the point in the system where all electronic service tool, or diagnostic tool (not shown), is connected to the system for servicing the system. Also shown because they interface with SEI module 30 are a vehicle speed sensor 32, a tachometer 34, and a speedometer 36.

Vehicle network 26 is microprocessor-based and may comprise its own computer. It provides electronic management and communications services for the vehicle, including servicing components other than the vehicle's engine. Network 26 is configured for compliance with ATA requirements for vehicle electronic networks and the corresponding SAE recommended practices. Data link 28 provides for communications within network 26 while also serving to transceive data between network 26 and SEI module 30. Thus the designation of the bi-directional path between data link 28 and SEI module 30 in FIG. 1 as "ATA/SAE" is intended to signify that the exchange of data between the SEI module and the network is in the format prescribed by ATA requirements and SAE recommended practices.

EEC module 22 is commercially produced as Model EEC IV by the Ford Motor Company for use as an engine management computer. As such, it is microprocessor-based for exercising control over various engine functions using various information supplied to it either as external commands or as feedback commands from various sources, such as sensors. The illustrated application of the present invention is on a diesel engine, and thus EEC module 22 provides output commands to electronic drive unit module 24 which operates diesel fuel injectors of the engine. Electronic drive unit module 24 is a separate module from EEC module 22.

One of the sensors that supplies information to EEC module 22 is an engine speed sensor which is not specifically shown in FIG. 1. This sensor is used to supply speed information to tachometer 34 and hence FIG. 1 shows an unidirectional path designated "TACH" from EEC module 22 to SEI module 30. There is also a bi-directional flow path designated "DCL" which carries data between EEC module 22 and SEI module 30. The data format for DCL transmissions corresponds to the "DCL" format of the EEC module.

One of the functions that is performed by SEI module 30 is to convert certain "DCL"-formatted data received from EEC module 22 into "ATA/SAE"-formatted data and transmit the latter to network 26. Correspondingly, another of the functions of SEI module 30 is to convert certain "ATA/SAE"-formatted data received from network 26 into "DCL"-formatted data and transmit the latter to EEC module 22.

Vehicle speed sensor 32 supplies vehicle speed data to SEI module 30, and module 30 in turn supplies that information to speedometer 36. As required by network 26, vehicle speed and engine speed information may be supplied to it via SEI module 30, and as required by EEC module 22, vehicle speed information may be supplied to it via SEI module 30. Tachometer 34 and speedometer 36 are disposed in the instrument panel of the vehicle so that the driver of the vehicle can observe both vehicle speed and engine speed.

Figure 2:
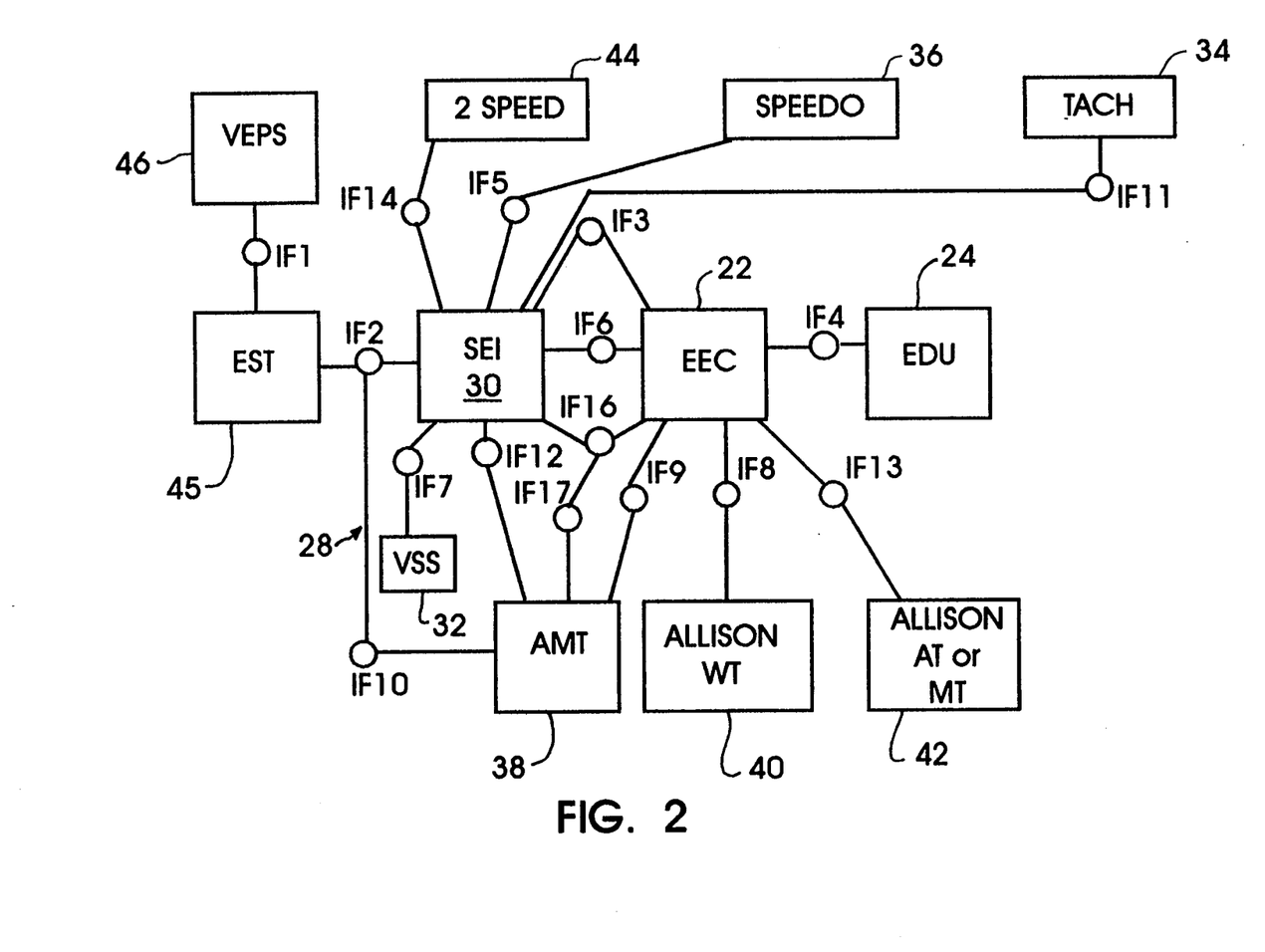
FIG. 2 is a diagram similar to FIG. 1 disclosing interfaces in the vehicle electronic system.

FIG. 2 is an interface diagram that discloses specific interfaces (designated by IF numbers) between system blocks, including some of those already described in FIG. 1 and several additional ones, as well. The additional blocks are interfaces for: an automated manual transmission 38; an Allison World Transmission 40; an Allison AT or MT transmission 42; and a two-speed axle switch 44, it being understood that the typical heavy-duty vehicle will have but a single transmission of one of these types. Interface IF 2 provides the interface between SEI module 30 and the ATA/SAE data link 28 of network 26 in FIG. 1, but in FIG. 2, interface IF2 is shown interfacing module 30 with an electronic service tool (EST) 45 using the facility provided by network 26 which is not shown. Like the SEI, the EST is an application of the ATA/SAE requests for network 26. The EST is in turn interfaced with a vehicle electronic programming station (VEPS) 46 as described by J1924 via interface IF1. Thus, FIG. 2 represents EST 45 servicing that portion of the total vehicle system shown in FIG. 2. EST 45 provides a means for programming or re-programming SEI module 30 and thereby EEC module 22 via module 30, using network 26 as applied to interface IF2.

Single designated interfaces exist between: EEC module 22 and electronic drive unit module 24 (IF4); vehicle speed sensor 32, and SEI module 30 (IF7); tachometer 34 and SEI module 30 (IF11); speedometer 36 and SEI module 30 (IF5); transmission 40 and EEC module 22 (IF8); transmission 42 and EEC module 22 (IF13); and two-speed axle 44 and SEI module 30 (IF14). There are multiple designated interfaces (IF3, IF6, IF16) between EEC module 22 and SEI module 30. Automated manual transmission 38 also has multiple interfaces (IF9, IF12, IF17) with various blocks as shown.

FIG. 2 focuses principally upon digital interfaces. IF17, IF9, IF8, IF13, IF4, IF11, and IF1 do not appear in FIGS. 3A and 3B because they do not impact SEI digital calculations.

Figure 3A:
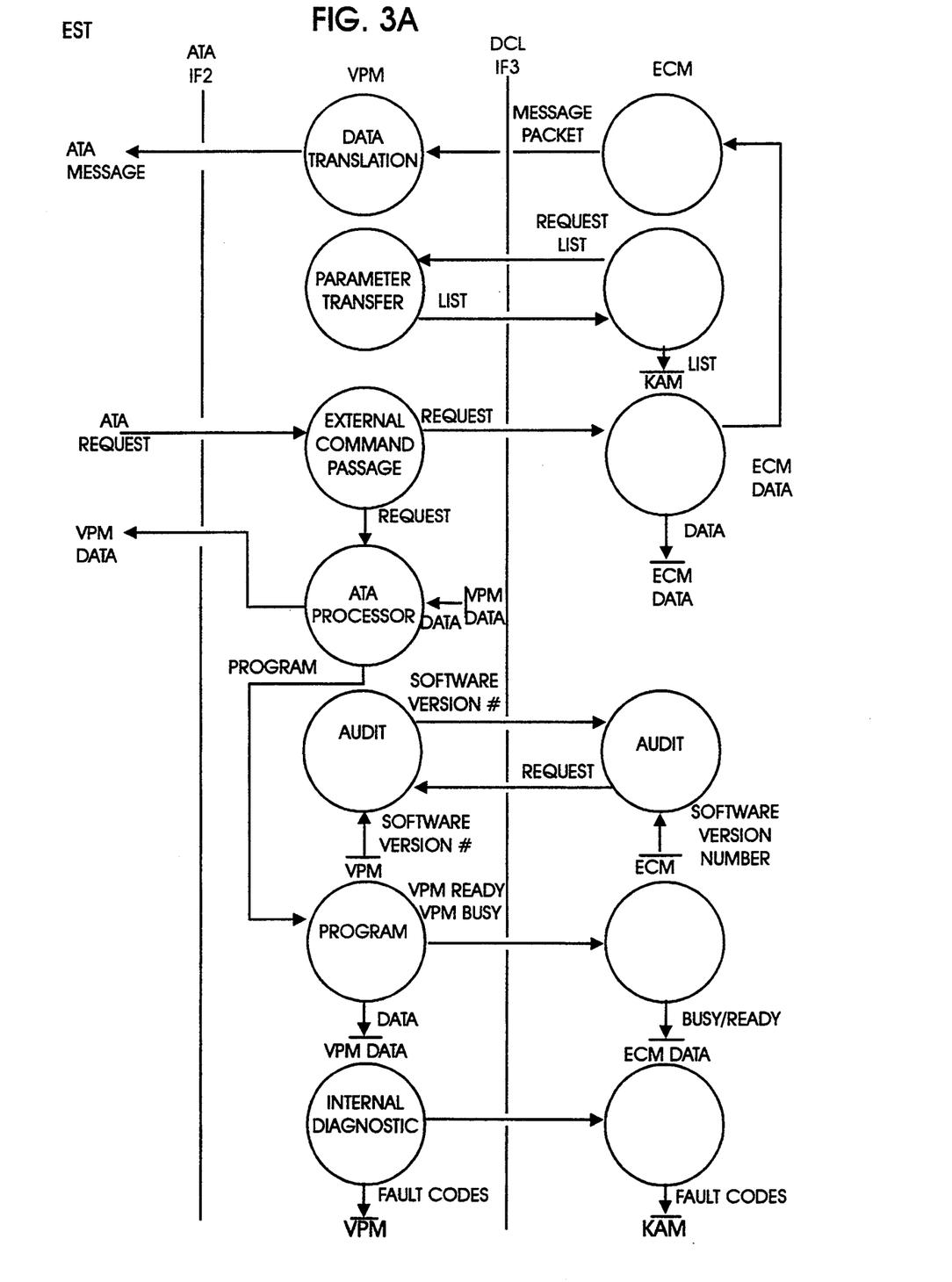
FIGS. 3A and 3B taken together constitute a generalized flow diagram illustrating certain data flows.
Figure 3B:
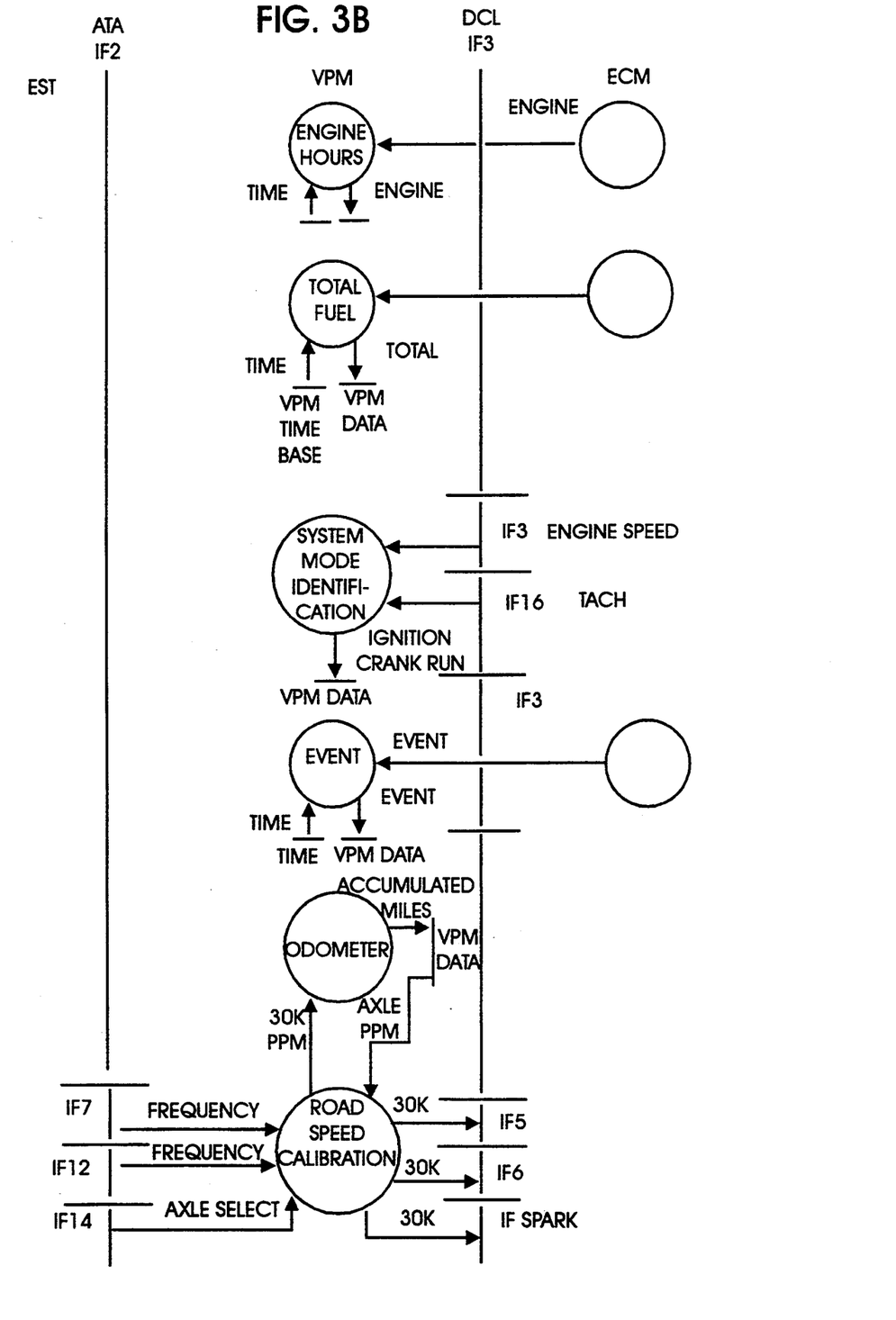

FIGS. 3A and 3B taken together constitute a generalized data flow diagram for flow of information from one block to another in the calculations of the SEI module. Information flows via interfaces IF2, IF7, IF12, IF16, IF6, IF3, IF5, and IF14. The SEI module buffers IF16 to provide the tach signal (IF11).

The diesel engine that powers the vehicle is considered to have four operational modes insofar as the vehicle system 20 is concerned. These modes are designated OFF, IGNITION, CRANK, and RUN, and they are defined as follows:

OFF-The vehicle's ignition switch is in the "off" position and ignition power is not applied to the modules in the system.

IGNITION-The ignition switch is in the "on" position, and electrical power is applied to the system without engine rotation.

CRANK-The ignition switch is in the "start" position, and electrical power is applied to the system. The starter motor relay is engaged and the engine is rotating at a speed less than low idle speed of the engine.

RUN-The starter motor relay is disengaged, and the engine is rotating at or above low idle.

Figure 4:
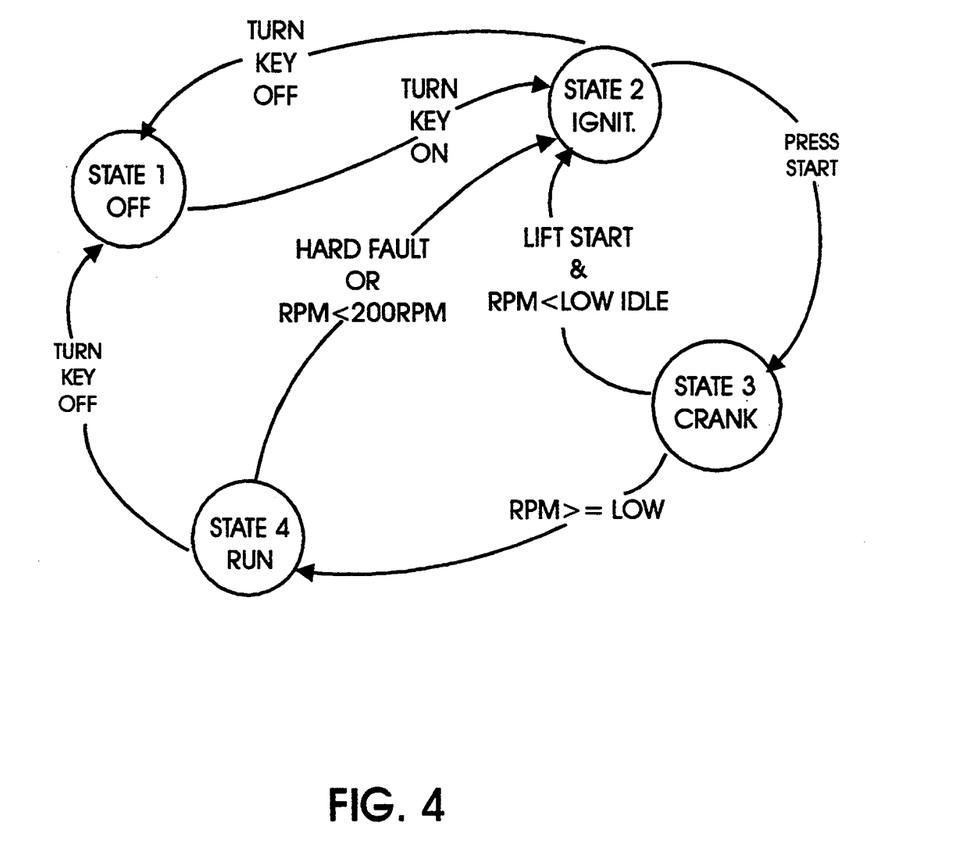
FIG. 4 is a diagram of certain defined modes for the system and also presents the types of transitions that can occur between different modes.
Figure 5:
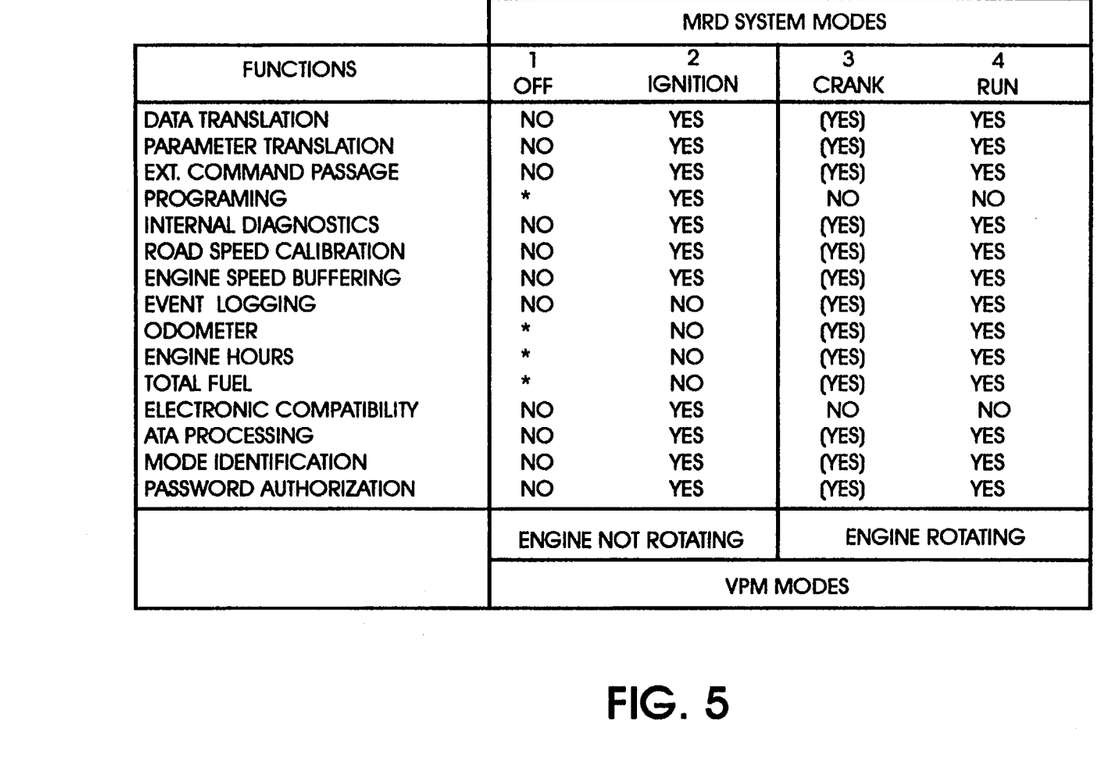
FIG. 5 is a mode table identifying various functions that can be performed by the system in each mode.

FIG. 4 is a diagram illustrating these modes, or states, and the various transitions that may occur between them. FIG. 5 is a mode table relating the four system modes to various functions that are performed by module 30. A designation YES in the table means that the stated function can be performed for a particular mode while a designation NO means that it cannot. Due to a major voltage drop that occurs during engine cranking, the YES designations under the heading CRANK are qualified.

SEI module 30 has a multi-pin electrical connector via which it connects into the system. The following table identifies the pins by number, by signal, and by destination. Internally, module 30 comprises its own computer that performs the functions that are required of the module.

| PIN | SIGNAL | DESTINATION |
|---|---|---|
| 1 | DCL + signal | ECM |
| 2 | DCL − signal | ECM |

-continued

| PIN | SIGNAL | DESTINATION |
|---|---|---|
| 3 | ATA/SAE data + signal | 8-way Data Link Connector |
| 4 | ATA/SAE data − signal | 8-way Data Link Connector |
| 5 | VSS Input + | Vehicle Speed Sensor |
| 6 | VSS Input − | Vehicle Speed Sensor |
| 7 | VSS Output 1 + | Spare |
| 8 | VSS Output 1 − | Spare |
| 9 | VSS Output 2 + (Cal) | Speedometer |
| 10 | VSS Output 2 − (Cal) | Speedometer |
| 11 | VSS Output 3 + (Cal) | Spare (J1809 Compatible) |
| 12 | VSS Output 3 − (Cal) | Spare |
| 13 | Switched Ignition | Fuse Block |
| 14 | Signal Ground | ECM |
| 15 | Power Ground | Battery − |
| 16 | Case Ground | Cab Ground Stud |
| 17 | Battery + (12 VDC) | Fuse Block |
| 18 | Tach Input + | ECM |
| 19 | Tach Output + (buf) | Instrument Panel |
| 20 | Tach Output − (buf) | Instrument Panel |
| 21 | Tach Output + (buf) | Spare (J1809 Compatible) |
| 22 | Tach Output + (buf) | Spare |

The functions which the module performs may be generally categorized as: data translation; parameter transfer; external command passage; programming; internal diagnostics; road speed calibration; engine speed buffering; odometer; engine hours; total fuel; electronic compatibility check; event logger; ATA processing; mode identification; and password authorization. Each of these categories will be described more fully below.

TRANSLATION OF MODULE 22 DATA

This function operates in the ignition, crank, and run modes. The data translation function transfers information received from interface IF3 to interface IF2. This data consists of regularly scheduled ATA parameter broadcasts, requested ATA parameters and diagnostics. Specific data provided by module 22 for data translation may include:

| PID | PARAMETER |
|---|---|
| 68 | Lubricant Rail Pressure |
| 85 | Cruise Control Status |
| 86 | Cruise Control Set RPM |
| 89 | Power Takeoff Status |
| 91 | Percent Accelerator Pedal Position |
| 92 | Percent Engine Load |
| 93 | Output Torque |
| 94 | Fuel Delivery Pressure |
| 100 | Engine Oil Pressure |
| 102 | Boost Pressure |
| 108 | Barometric Pressure |
| 110 | Engine Coolant Temperature |
| 111 | Coolant Level |
| 168 | Volts (Battery) |
| 171 | Ambient Air Temperature |
| 183 | Fuel Rate |
| 190 | Engine Speed |
| 194 | Transmitter System Diagnostic Code and Occurrence Count Table |
| 196 | Diagnostic Data/Count Clear Response |
| 254 | Diagnostic Test Responses |

PARAMETER TRANSFER TO MODULE 22

This function operates in the ignition, crank, and run modes. The parameter transfer function provides EEC module 22 with information describing the calibration for the engine and the availability of (and data required for) various control features. Parameter transfer is initiated by EEC module 22 through control codes transmitted to module 30 over interface IF3. Module 22 sends control codes during the ignition or run modes. The control codes request three separate sets of data, short list (highest priority), high priority list, and the low priority list. An example of some of the typical content of these lists is:

| PARAMETER |
|---|
| VPM SOFTWARE VERSION |
| ECM INCOMPATIBLE VERSION |
| PARAMETER DATA CHECK-SUM |
| GLOW PLUG ENABLE |
| PRESET ENGINE SPEED 1 |
| HIGH CRUISE SET SPEED LIMIT |
| ECT - WARNING |
| MAX VEHICLE SPEED |
| ENGINE FAMILY RATING CODE |
| RATED ENGINE SPEED |
| RATED HORSEPOWER |

EXTERNAL COMMAND PASSAGE TO MODULE 22

This function operates in the ignition, crank, and run modes. The external command passage function forwards requests received from interface IF2 to module 22 via interface IF3. Requests are forwarded during the ignition, crank, and run system modes. Before forwarding, requests are screened for handling by module 30. Those requests that the SEI shall fulfill are not forwarded to the ECM. They are referred to the ATA processor function for processing.

The external command process involves three classes of request interaction between modules 30 and 22. (1) Module 22 may be totally responsible for processing the request. (2) Module 30 may be totally responsible for processing the request. (3) Both modules 22 and 30 process and respond to the request.

Module 30 replies to requests for Total Vehicle Miles, Engine Hours, Total Fuel and Vin and are all examples of requests that the external command passage function forwards to the SEI's own ATA processing function. External command passage also forwards programming requests to the programming function.

Network 26 elements may request module 22 to perform unique diagnostic procedures on demand via interface IF2. Such requests for module 22 to perform diagnostic tests are forwarded to module 22 by external command passage in module 30. Module 30 takes no further actions on these requests.

Requests for J1587 PID 196 may require that both modules 30 and 22 respond to the request. Since both modules 30 and 22 perform diagnostics, both modules may need to clear their individual fault log in response to this standardized diagnostic request. Because each module contains an individual fault log, coordinated responses to requests for PID 194 must be performed. To permit such coordinated responses, external command passage forwards these requests to both module 22 and module 30 internal functions.

PROGRAMMING

This function operates only in the ignition mode. Module 30 monitors engine speed over interface IF3 and senses activity on the tachometer input via interface IF16 to ensure the system is in the ignition mode. When a suitably coded programming request is made of module 30 over interface IF2, module 30 determines system mode. If the system is in the ignition mode, module 30 evaluates the requested security authorization using the password received in the request. If authorization is confirmed, module 30 again checks the system mode. If the mode is valid, module 30 writes the received information to non-volatile storage.

At programming completion, module 30 replies to the programming request with a status message. This message conveys the results of the request to the programming source. (Results include successful or aborted message, and the resulting data values.) The programming function also computes parameter tattle-tales, maintaining the number of times a parameter has been changed, and the number of overall changes.

The programming function also records the serial number of the last service tool (EST) 45 to have updated the proprietary data values and separately records the serial number of the last service tool to have updated the customer data parameters.

While the programming function is operational, any prompt issued by EEC module 22, over interface IF3, is answered by a module 30 "busy" message.

The programming function provides two different aspects of security to the system. The software in module 30 provides security for the programmable parameters stored in its non-volatile memory. Each parameter has been assigned a security level (1—Customer, or 2—Proprietary) to control which personnel may read and/or alter the data. Each security level is protected by a corresponding password authorization method.

Module 30 is capable of being completely reprogrammed many times, and can be programmed in the absence of the ECM, EDU, and all other sensors and switches. The minimum configuration, required for proprietary level programming, is electrical connection to pins 3, 4, 13, 15, and 17 on SEI module 30, EST 45, and VEPS module 46.

INTERNAL DIAGNOSTICS

This function operates in the ignition, crank, and run modes. Module 30 completes internal power-up self-test within 150 ms. When the ignition is turned on, module 30 should validate its memory content to insure that the engine rating and customer feature data have not become corrupt. It uses a memory storage scheme which permits single bit error correction and multiple bit detection of parameter data by storing a corrective code with the data. When correctable memory errors are found, module 30 logs the fault and uses the corrected data.

Module 30 also contains a watchdog timer to prevent operation in an indeterminate state. The watchdog timer forces module 30 to resume normal operation within one second.

Module 30 is capable of sending self-test fault codes to EEC module 22 and to the EST to indicate errors that include but are not limited to: Vss signal errors, data communication errors, EEPROM checksum errors, RAM and ROM errors. Required error codes are described in the VPM software requirements specification.

ROAD SPEED CALIBRATION

This function provides vehicle speed signal conditioning during the ignition, crank, and run modes. Three calibrations are provided. Each signal provides 30,000 (+/−0.5%) pulses per mile. Module 30 derives the vehicle speed signal from a sensor located at the tailshaft of the vehicle transmission and calibrates the tailshaft signal to account for differences in tire size and rear-axle ratio. The two-speed axle input is provided to allow selection of one of the two pulses per mile values. Module 30 has the ability to detect the absence of the Vss signal from the speed sensor. If absence is detected, the module 30 logs a fault code. The following is a description of vehicle speed sensor diagnostics.

Vehicle speed sensors are typically variable reluctance technology devices (magnetic pickups). These devices are typically mounted in a boss where an exciter ring attached to the transmission output shaft induces a voltage waveform. Since the transmission output shaft is attached to the driveline and rear differential, the exciter ring's speed of rotation measures vehicle speed.

Variable reluctance devices insert a coil of wire with a given resistance into the circuit. The application of an external voltage to the circuit permits the coil's resistance to be measured through the voltage drop induced by the coil. Through such measurements, open and short circuit conditions may be detected. These conditions indicate either a fault in the sensor or the absence of the sensor.

While the vehicle is moving, the sensor generates a voltage waveform VSS whose frequency indicates vehicle speed. The faster the vehicle travels, the larger the amplitude of the voltage becomes. Vehicle motion, therefore, generates uncertainty in circuit voltage measurement at a given point in time. Thus, attempting to determining sensor status while the vehicle is moving is problematic.

This diagnostic technique may be applied whenever the input frequency is low enough to permit the load to settle the diagnostic voltage, before the sensor is excited by another tooth. As a part of vehicle speed calibration, the microprocessor may estimate the waveform frequency and judge whether the diagnostic technique may be applied at any particular point in time. Such judgment may be performed frequently. This results in a high probability of detecting a fault relating the VSS input, before vehicle launch and a continued evaluation of VSS status while the vehicle is stationary.

ENGINE SPEED BUFFERING

This function operates in the ignition, crank, and run modes. Module 30 provides engine speed signal conditioning.

ODOMETER

This function operates in the ignition, crank, and run modes of the system. Module 30 accumulates vehicle miles, based on the vehicle speed signal input. The storage of this data requires redundant memory locations, to prevent programming wear-out of the EEPROM. This function provides 0.1 mile resolution.

ENGINE HOURS

This function operates in the crank and run modes. This function accumulates engine hours. The storage of this data requires redundant memory locations, to prevent programming wear-out of the EEPROM. This function provides 0.05 hour/bit resolution.

TOTAL FUEL

This function operates in the crank and run system modes. Module 30 computes total fuel consumption. This function integrates the fuel rate value of PID 183, over time, to produce total gallons of fuel used by the vehicle. The resolution of this value is 0.125 gal/bit.

ELECTRONIC COMPATIBILITY CHECK

This function operates in accordance with the method described below. Modules 22 and 30 perform software version checking. The functional principles behind electronic compatibility checking are the following. It is the responsibility of both modules in a pair to perform software version checking. Only downward compatibility need be considered in a check. It is the responsibility of each module to know the last software version of its opposite with which it is compatible. Beyond that point, the module is no longer downward compatible with its opposite. When that point exceeded, the module shall declare that an compatible pair exists.

To perform compatibility checking, the two modules exchange their software version numbers. Each compares the version number it obtained with its last known compatible version. If the software version number received is less than the last known compatible version, the two modules are incompatible.

Since both modules test for downward compatibility, neither has to test for upward compatibility. Assuming that software version numbers will always increase as the modules change, successor modules can always know the last compatible software version of its opposite. When the version number received by a module supersedes (is greater than) the last known compatible version, the opposing module decides whether it is downward compatible with the first module. Thus, the first module does not need compute upward compatibility with its neighbor.

Assume that X and Y are a pair of opposing modules. The table below shows example compatibility results for X and Y. The SW Ver. columns show the software version of the modules for each example. The Last Ver. columns show the last compatible software version of its neighbor. The rightmost column describes the calculation's result for each example. For example b, module Y is incompatible below version 3 of module X; and module X is incompatible below version 1 of module Y. Module X assumes that X and Y are compatible since (1<=4). Module Y declares that X is not compatible with Y since (3<=2).

EXAMPLE COMPATIBILITY CHECKS

| | EXAMPLE COMPATIBILITY CHECKS | | | | |
|---|---|---|---|---|---|
| | MODULE X | | MODULE Y | | |
| | SW Ver. | Last Ver. | SW Ver. | Last Ver. | COMPATIBILITY CHECK RESULT |
| a) | 2 | 2 | 1 | 1 | X says Y is not compatible |
| b) | 2 | 1 | 4 | 3 | Y says X is not compatible |
| c) | 2 | 0 | 1 | 1 | X and Y are compatible |
| d) | 3 | 1 | 2 | 1 | X and Y are compatible |
| e) | 1 | 1 | 2 | 1 | X and Y are compatible |

A measure of hardware compatibility among opposing modules can also be obtained by this method, by encoding hardware version information in the software version information. This assumes that the means for exchanging software version information does not change as a part of the hardware changes. Because the software compatibility method depends upon successor modules having greater software versions than the predecessors, the software versions and last compatible versions can be artificially manipulated (by incrementing their values) to insure that modules with incompatible hardware are not permitted to operate together. Since the software versions are easily incorporated in the ROM of a module, the impact of changes in hardware are readily captured in this way.

EVENT LOGGER

The VPM indicates the occurrence of the following engine parameter limit violations: overspeed, engine coolant temperature (high), engine coolant level (low), and engine oil pressure (low). These conditions are indicated by the engine hours at which they occurred. There are two engine hour indicators per parameter. This allows for two violations to be logged per parameter, after which the first of two values is overwritten. These violations are detected by module 22. Module 30 is notified of a violation via interface IF3; module 30 logs the engine hours of the violation.

ATA PROCESSING

Module 30 responds to certain ATA network requests. The VPM shall also provide periodic broadcast of certain parameters on the ATA network. Broadcast data includes the following J1587 data:

| PID | |
|---|---|
| 69 | Two-Speed Axle State |
| 84 | Vehicle Speed |
| 191 | Transmission Shaft Output Speed |
| 194 | Transmitter System Diagnostic Code & Occurrence Count |
| 245 | Total Miles |

Responses include the following for ATA network requests:

| PID | |
|---|---|
| 237 | VIN |
| 247 | Total Engine Hours |
| 250 | Total Fuel Used |
| 194 | Transmitter System Diagnostic Code & Occurrence Count |
| 196 | Diagnostic Data/Count Clear Response |
| 254 | Module 22 Unique Diagnostic Test Responses |

J1587 describes the network request message structure.

MODE IDENTIFICATION

Module 30 determines its mode by monitoring PID 190 from interface IF3 (engine speed) and detecting tachometer activity from module 22 via interface IF16 (tachometer). If engine speed is determined to be less than a certain number of pulses per unit time, module 30 is in the ignition mode. If engine speed is detected greater than or equal to that number of pulses per unit time, module 30 is in either the crank or run mode.

PASSWORD AUTHORIZATION

This function operates in the ignition mode. Two levels of password protection are used for engine rating and feature data contained in module 30. They are:
1. Customer
2. Proprietary (to vehicle manufacturer)

Customer passwords function in a manner similar to passwords used in typical on-line computer systems. The customer inputs his password, when requested, to change/read customer level parameters. The password is authorized by comparing the characters input to those stored in the VPM's password 1 data element. The customer may change his password at any time. Preferably, when null values are provided for the customer password, all requests to modify customer data are ignored. The proprietary password may be used to restore customer control by providing a non-null customer password value.

To authorize a request that requires the proprietary password to be used, an unpublished software algorithm is executed by module 30. For each request, this algorithm produces a randomly variable password based on a subset of the data values contained in module 30 and the request. The programming request to be fulfilled must be included in the proprietary password algorithm's input. The algorithm ensures that passwords generated reflect the request and cannot be used for any other purpose. The algorithms output must appear to be arbitrary. It should not be possible to deduce the algorithm without significant cost and effort when given a small sample of inputs and outputs.

Figure 6:
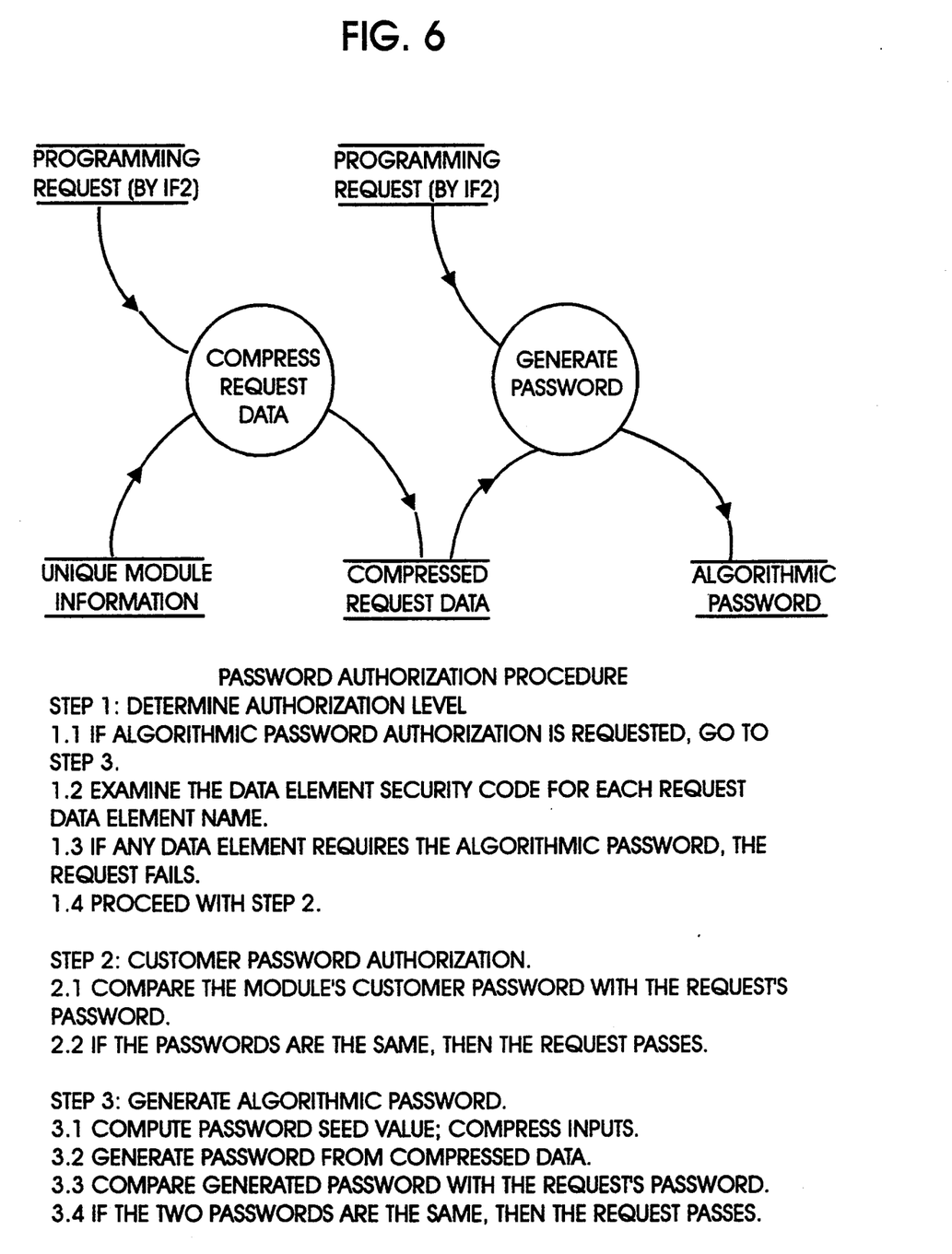
FIG. 6 is a general explanatory flow diagram relating to certain steps of the security methods utilized in the system.

FIG. 6 illustrates certain steps of a preferred method for password authorization.

While a presently preferred embodiment of the invention has been illustrated and described, it should be appreciated that principles of the invention may be embodied in other ways that fall within the scope of the following claims. For example, principles may be embodied in non-automotive uses, such as marine uses.

What is claimed is:

1. An on-board electronic data management system in an automotive vehicle that is powered by an engine comprising:
A) a data link that serves the vehicle;
B) an electronic engine management system, comprising its own microprocessor that services the engine and comprises means for transceiving data in a particular electronic format that is different from an electronic data format of said data link; and
C) a module comprising its own microprocessor that interfaces said data link and said electronic engine management system to provide bi-directional through-transmission of data between said data link, and said electronic engine management system, and that further comprises,
1) means for receiving data in said particular electronic format from said electronic engine management system, for translating the received data into the electronic format of said data link, and for transmitting the translated received data to said data link, and
2) means for receiving data from said data link in the electronic format of the data link, for translating the last-mentioned received data into said particular electronic format of said electronic engine management system, and for transmitting the last-mentioned translated received data to said electronic engine management system.

2. An on-board electronic data management system in an automotive vehicle as set forth in claim 1 in which the vehicle includes a speed sensor for sensing vehicle speed, said electronic engine management system utilizes vehicle speed information, and that vehicle speed information is supplied from said speed sensor via said module to said electronic engine management system, and said module further comprises means for detecting the presence or absence of said speed sensor at vehicle launch.

3. An on-board electronic data management system in an automotive vehicle as set forth in claim 1 in which said module comprises means for confirming that said module and said electronic engine management system are mutually software- and hardware-compatible.

4. An on-board electronic data management system in an automotive vehicle as set forth in claim 1 in which:
   D) the vehicle includes 1) a speed sensor for sensing vehicle speed and 2) display means, on said data link, for displaying speedometric and tachometric information to the driver of the vehicle,
   E) said electronic engine management system utilizes vehicle speed information,
   F) that vehicle speed information is supplied from said speed sensor via said module to both said electronic engine management system and said display means, and
   G) said electronic engine management system provides engine speed information, and that engine speed information is supplied from said electronic engine management system via said module to said display means.

5. An on-board electronic data management system in an automotive vehicle as set forth in claim 4 in which said module also comprises means for calibrating the speed signal from said speed sensor.

6. An on-board electronic data management system in an automotive vehicle as set forth in claim 1 in which said module further comprises programmable memory that is programmed to provide a customized engine control for the vehicle, and a security system to prevent unauthorized alteration of previously programmed data.

7. An on-board electronic data management system in an automotive vehicle as set forth in claim 6 in which said security system comprises means providing multiple levels of security, one of which is inaccessible to a customer.

8. An on-board electronic data management system in an automotive vehicle that is powered by an engine comprising:
   A) a data link that serves the vehicle;
   B) an electronic engine management system comprising its own microprocessor that services the engine; and
   C) a module comprising its own microprocessor that interfaces said data link and said electronic engine management system to provide bi-directional through-transmission of data between said data link and said electronic engine management system;
   D) wherein at least one of said electronic engine management system and said module comprises programmable parameter storage means for storing one or more programmable parameters relating to operation of such an automotive vehicle, and said module comprises secured means for programming and re-programming values of said one or more parameters by means of password authorizations.

9. An on-board electronic data management system in an automotive vehicle that is powered by an engine comprising:
   A) an electronic data link that services components of the vehicle including components other than the engine and comprises means for transceiving data;
   B) an electronic engine management system comprising its own microprocessor that services the engine and comprises means for transceiving data; and
   C) a module, comprising its own microprocessor that interfaces said data link and said electronic engine management system to provide bi-directional through-transmission of data between said data link and said electronic engine management system;
   D) wherein said electronic engine management system and said module comprise compatibility checking means for checking compatibility of each with the other in a downward direction such that each successor version of each is assigned a successively higher version number, and each is programmed with the version number beyond which it ceases to be compatible with the other.

10. An on-board electronic data management system in an automotive vehicle that is powered by an engine comprising:
    A) an electronic engine management system comprising its own microprocessor that services the engine;
    B) a module comprising its own microprocessor that services components of the vehicle including components other than the engine;
    C) means interfacing said module and said electronic engine management system such that the two mutually interact in management of the vehicle;
    D) compatibility checking means for checking mutual software- and hardware-compatibility of said module and said electronic engine management system; and
    E) means for indicating that said compatibility checking means has detected incompatibility of said module and said electronic engine management system.

11. An on-board electronic data management system as set forth in claim 10 in which said compatibility checking means comprises means for each of said module and said electronic engine management system to perform the compatibility checking by downward compatibility checking with the other, each subsequent version of each of said module and said electronic engine management system being assigned a version number that is greater than preceding versions, and such version numbers signifying both software- and hardware-compatibility.

* * * * *